US008744206B2

(12) United States Patent
Nomura et al.

(10) Patent No.: US 8,744,206 B2
(45) Date of Patent: Jun. 3, 2014

(54) IMAGE PROCESSING APPARATUS, IMAGE PROCESSING METHOD, AND PROGRAM

(75) Inventors: Yoshikuni Nomura, Tokyo (JP); Masayuki Tachi, Tokyo (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 13/482,454

(22) Filed: May 29, 2012

(65) Prior Publication Data

US 2012/0314946 A1      Dec. 13, 2012

(30) Foreign Application Priority Data

Jun. 9, 2011   (JP) .................................. 2011-128824

(51) Int. Cl.
   *G06K 9/40*           (2006.01)
(52) U.S. Cl.
   USPC ........................... 382/266; 382/260; 382/264
(58) Field of Classification Search
   CPC ........... G06T 2207/20028; G06T 2207/20182; G06K 9/40
   USPC ........................................ 382/266, 264, 260
   See application file for complete search history.

(56) References Cited

U.S. PATENT DOCUMENTS

| 5,641,596 | A | * | 6/1997 | Gray et al. | 430/21 |
| 5,771,318 | A | * | 6/1998 | Fang et al. | 382/261 |
| 6,999,634 | B2 | * | 2/2006 | Hong | 382/275 |
| 7,206,101 | B2 | * | 4/2007 | Avinash | 358/3.26 |
| 8,238,684 | B2 | * | 8/2012 | Yamajo et al. | 382/260 |
| 8,600,188 | B2 | * | 12/2013 | Segall | 382/260 |
| 2007/0147697 | A1 | * | 6/2007 | Lee et al. | 382/260 |

FOREIGN PATENT DOCUMENTS

| JP | 2001-036769 A | 2/2001 |
| JP | 2005-184786 A | 7/2005 |
| JP | 2005-286678 A | 10/2005 |
| JP | 2010-081497 A | 4/2010 |

OTHER PUBLICATIONS

Jin, F.; Fieguth, P.; Winger, L.; Jernigan, E., "Adaptive Wiener filtering of noisy images and image sequences," Image Processing, 2003. ICIP 2003. Proceedings. 2003 International Conference on , vol. 3, No., pp. III,349-352 vol. 2, Sep. 14-17, 2003.*

Tomasi, C., et al., "Bilateral Filtering for Gray and Color Images", IEEE International Conference on Computer Vision, 1998, 8 pages, Bombay, India.

Buades, A., et al., "A Non-Local Algorithm for Image Denoising", IEEE Computer Society Conference on Computer Vision and Pattern Recognition, 2005, 6 Pages, vol. 2, San Diego, California.

* cited by examiner

*Primary Examiner* — Utpal Shah
(74) *Attorney, Agent, or Firm* — Wolf, Greenfield & Sacks, P.C.

(57) ABSTRACT

Provided is an image processing apparatus including an infinite impulse response (IIR) mean value calculation section for calculating a mean value of signal values of reference pixels around a correction target pixel according to an IIR filter application process, an IIR variance value calculation section for calculating a variance value of the signal values of the reference pixels around the correction target pixel according to the IIR filter application process, an edge-preserving smoothing processing section for receiving the mean and variance values of the reference pixels and executing an edge-preserving smoothing process to which the mean and variance values are applied, and an IIR filter coefficient calculation section for updating an IIR filter coefficient to be applied to the IIR mean value calculation section and the IIR variance value calculation section according to a signal value of a pixel constituting an image.

14 Claims, 8 Drawing Sheets

FIG.2

| R | G | R | G | R | G | R |
|---|---|---|---|---|---|---|
| G | B | G | B | G | B | G |
| R | G | R | G | R | G | R |
| G | B | G | B | G | B | G |
| R | G | R | G | R | G | R |
| G | B | G | B | G | B | G |
| R | G | R | G | R | G | R |

FIG.3

| R | W | G | W | R | W | G |
|---|---|---|---|---|---|---|
| W | B | W | G | W | B | W |
| G | W | R | W | G | W | R |
| W | G | W | B | W | G | W |
| R | W | G | W | R | W | G |
| W | B | W | G | W | B | W |
| G | W | R | W | G | W | R |

IMAGE PROCESSING APPARATUS, IMAGE PROCESSING METHOD, AND PROGRAM

BACKGROUND

The present disclosure relates to an image processing apparatus, an image processing method, and a program. More particularly, the present disclosure relates to an image processing apparatus, an image processing method, and a program, which remove noise included in an image.

As technology for removing noise from an image, a process of filtering the image is well known. For example, various techniques including traditional image processing technology as in a median filter or a Wiener filter have been proposed Recently, a widely used technique has been a bilateral filter or a non-local (NL)-means filter.

The bilateral filter is disclosed, for example, in C. Tomasi and R. Manduchi's "Bilateral Filtering for Gray and Color Images," Proceedings of the IEEE International Conference on Computer Vision, 1998.

The NL-means filter is disclosed, for example, in A. Buades, B. Coll, and J. M. Morel's "A Non-Local Algorithm for Image Denoising," Proceedings of the IEEE International Conference on Computer Vision and Pattern Recognition, 2005.

The filter application processes are processes of correcting a pixel value of a pixel of interest, for example, by designating peripheral pixels around the pixel of interest serving as a denoising target as reference pixels and employing an arithmetic mean value of a plurality of pixel values of the reference pixels in any technique.

In the technique of the related art, the peripheral pixels are usually selected from a rectangle region centered on a pixel-of-interest position. If a filtering operation is performed using a signal of an isotropic region, a phase shift cannot easily occur in the processed image and a visually desirable image can be obtained.

On the other hand, a general camera signal processing section, that is, a camera signal processing section for processing an output signal of an imaging element, has a kind of memory referred to as a delay line on which pixel values of row units previously read from the imaging element are stored, and generally performs various signal processing operations such as pixel value correction while referring to pixel data of a predetermined local region including memory-stored data.

A configuration in which means for executing an "edge-preserving smoothing process" similar to the above-described bilateral filter with a delay line used in many cameras is mounted as a denoising means has been proposed.

In principle, the "edge-preserving smoothing process" is a low pass filter (LPF) application process. The strength of smoothing can be controlled by a cutoff frequency of the LPF.

Although the strength of smoothing can be increased by decreasing a cutoff frequency, a pixel value of a position farther from a pixel of interest should be referred to for implementation of a filter of which the cutoff frequency is low. In order to refer to distant pixels in camera signal processing, pixel values of pixels apart from the pixel of interest need to be retained and consequently, a memory of more delay lines is necessary.

That is, there is a problem in that hardware cost is necessarily increased to implement a high-performance denoising process.

In order to solve the problem that the hardware cost is increased when a broad region is referred to, various methods using an infinite impulse response (IIR) filter have been proposed, for example, in Japanese Patent Application Laid-Open Nos. 2001-36769, 2005-184786, 2005-286678, and 2010-81497. In the IIR filter, a filtering operation is performed as a process only referring to a current signal and a previous signal with respect to a signal input along time series.

In processing according to an embodiment of the present disclosure, description will be given using a primary IIR filter. When the IIR filter is used in image processing, the processing is performed using pixels of an anisotropic region with respect to a pixel of interest.

Thus, there is a problem in that a phase is easily shifted and an edge of an image is blurred in a specific direction. A method of weakening the strength of smoothing is effective as a method of suppressing the phase shift. This is implemented in any method in the related art.

However, there is a problem in that control of the strength of smoothing is insufficient in the related art. In principle, an edge-preserving smoothing process based on the IIR filter calculates a low frequency component of a signal using the IIR filter and blends an original signal according to edge strength of the original signal.

An edge is preserved by further blending the original signal when there is a clear edge in a signal.

On the other hand, by blending the original signal as little as possible when there is no clear edge, only a low frequency component of a signal is obtained and smoothing is performed.

It is possible to selectively suppress only small amplitude (=noise) in a flat part of a signal by performing the process as described above.

More specifically, the edge-preserving smoothing process based on the IIR filter will be described with reference to the following Expression (1).

$$p_{IIR}(t) = \alpha(t)p(t) + (1-\alpha(t))p_{IIR}(t-1) \qquad (1)$$

In the above-described Expression (1), t denotes a time, p(t) denotes a signal value (=a pixel value before correction of a pixel of interest of a correction (denoising) target), and $p_{IIR}(t)$ denotes an edge-preserving smoothed signal (=a pixel value after the correction of the pixel of interest) using the IIR filter.

$\alpha(t)$ is a variable of which a range is [0, 1], that is, $\alpha=0$ to 1, and is adaptively changed so that the more the strength of an edge, the greater the value.

It is preferable that the variable $\alpha(t)$ continuously vary with the edge strength. This is because a discontinuous change in edge detection results in an extreme change of the smoothing strength and is visually undesirable.

In the related art, there is a problem in that sufficient performance is not obtained or a discontinuous change in the edge detection leads to the degradation of image quality because a method of determining the variable $\alpha(t)$ is ad hoc.

In Japanese Patent Application Laid-Open Nos. 2001-36769 and 2005-184786 described above, there is a problem in that switching of processing is conspicuous because the presence/absence of an edge is classified into two values in the edge detection.

In addition, although the edge-preserving smoothing process using a method corresponding to the above-described Expression (1) is performed in Japanese Patent Application Laid-Open Nos. 2005-286678 and 2010-81497, there is a problem in that the edge is not necessarily sufficiently preserved because an arbitrarily determined broken line is used when the variable α(t) is determined.

SUMMARY

It is desirable to provide an image processing apparatus, an image processing method, and a program, which remove noise included in an image.

Also, it is desirable to provide an image processing apparatus, an image processing method, and a program, which enable effective denoising referring to a large number of pixels to be performed with a small-scale circuit by executing an edge-preserving smoothing process based on an IIR filter.

According to a first embodiment of the present disclosure, there is provided an image processing apparatus including:

an IIR mean value calculation section for calculating a mean value of signal values of reference pixels around a correction target pixel according to an IIR filter application process;

an IIR variance value calculation section for calculating a variance value of the signal values of the reference pixels around the correction target pixel according to the IIR filter application process;

an edge-preserving smoothing processing section for receiving the mean and variance values of the reference pixels and executing an edge-preserving smoothing process to which the mean and variance values are applied; and an IIR filter coefficient calculation section for updating an IIR filter coefficient to be applied to the IIR mean value calculation section and the IIR variance value calculation section according to a signal value of a pixel constituting an image.

Further, in the image processing apparatus according to the first embodiment of the present disclosure, the edge-preserving smoothing processing section executes the edge-preserving smoothing process based on a Wiener filter application process.

Further, in the image processing apparatus according to the first embodiment of the present disclosure, the edge-preserving smoothing processing section calculates a signal value after correction of the correction target pixel by a process of blending the mean value generated by the IIR mean value calculation section and a signal value of the correction target pixel according to the variance value calculated by the IIR variance value calculation section.

Further, in the image processing apparatus according to the first embodiment of the present disclosure, the edge-preserving smoothing processing section is configured to calculate a signal value after correction of the correction target pixel by a process of blending the mean value generated by the IIR mean value calculation section and a signal value of the correction target pixel, and executes the blend process in which a blend rate is set to (v1−v2)/v2 when the variance value calculated by the IIR variance value calculation section is v1 and a parameter by which strength of edge-preserving smoothing is controlled is v2.

Further, in the image processing apparatus according to the first embodiment of the present disclosure, the edge-preserving smoothing processing section is configured to calculate a signal value after correction of the correction target pixel by a process of blending the mean value generated by the IIR mean value calculation section and a signal value of the correction target pixel, and executes the blend process in which a blend rate is set to v1/(v1+v2) when the variance value calculated by the IIR variance value calculation section is v1 and a parameter by which strength of edge-preserving smoothing is controlled is v2.

Further, in the image processing apparatus according to the first embodiment of the present disclosure, the IIR filter coefficient calculation section sequentially calculates a new IIR filter coefficient according to an input signal value.

Further, in the image processing apparatus according to the first embodiment of the present disclosure, the IIR filter coefficient calculation section sequentially calculates a new IIR filter coefficient according to the variance value calculated by the IIR variance value calculation section.

Further, in the image processing apparatus according to the first embodiment of the present disclosure, the IIR filter coefficient calculation section sequentially calculates a new IIR filter coefficient based on a difference between a signal value of the correction target pixel and the mean value calculated by the IIR mean value calculation section.

Further, in the image processing apparatus according to the first embodiment of the present disclosure, the IIR filter coefficient calculation section sequentially calculates a new IIR filter coefficient based on a difference between a signal value of the correction target pixel and a signal value of a previous input pixel.

Further, in the image processing apparatus according to the first embodiment of the present disclosure, a two-dimensional image signal is input as a processing target image, and the edge-preserving smoothing process is applied in at least one of horizontal and vertical directions.

Further, in the image processing apparatus according to the first embodiment of the present disclosure, a two-dimensional image signal is input as a processing target image, the edge-preserving smoothing process is applied in at least one of horizontal and vertical directions, and an isotropic edge-preserving smoothing process is executed in the other direction.

Further, in the image processing apparatus according to the first embodiment of the present disclosure, a luminance signal image and a color signal image are separately input as a processing target image, and a process in which strength of edge-preserving smoothing is changed for each image is executed.

Further, according to a second embodiment of the present disclosure, there is provided an image processing method to be executed in an image processing apparatus, including:

calculating, by an IIR mean value calculation section, a mean value of signal values of reference pixels around a correction target pixel according to an IIR filter application process;

calculating, by an IIR variance value calculation section, a variance value of the signal values of the reference pixels around the correction target pixel according to the IIR filter application process;

receiving, by an edge-preserving smoothing processing section, the mean and variance values of the reference pixels and executing an edge-preserving smoothing process to which the mean and variance values are applied; and updating, by an IIR filter coefficient calculation section, an IIR filter coefficient to be applied in the IIR mean value calculation step and the IIR variance value calculation step according to a signal value of a pixel constituting an image.

Further, according to a third embodiment of the present disclosure, there is provided a program for causing an image processing apparatus to execute image processing including:

calculating, by an IIR mean value calculation section, a mean value of signal values of reference pixels around a correction target pixel according to an IIR filter application process;

calculating, by an IIR variance value calculation section, a variance value of the signal values of the reference pixels around the correction target pixel according to the IIR filter application process;

receiving, by an edge-preserving smoothing processing section, the mean and variance values of the reference pixels and executing an edge-preserving smoothing process to which the mean and variance values are applied; and updating, by an IIR filter coefficient calculation section, an IIR filter coefficient to be applied in the IIR mean value calculation step and the IIR variance value calculation step according to a signal value of a pixel constituting an image.

The program of the present disclosure is a program that can be provided by means of a storage medium to an information processing apparatus or a computer system, for example, which can execute various program codes. The program is executed by a program execution section on the information processing apparatus or the computer system, so that a process corresponding to the program can be executed.

Further objects, features, and advantages of the present disclosure will become apparent from the detailed description of embodiments with reference to the attached drawings. In this specification, the system is a logical set configuration including a plurality of devices. It is not necessary that the devices be in the same housing.

According to embodiments of the present disclosure as described above, an apparatus and method for reducing noise of an image is implemented.

Specifically, for example, mean and variance values of signal values of reference pixels around a correction target pixel are calculated according to an IIR filter application process. An edge-preserving smoothing process based on a Wiener filter application process is executed by receiving the calculated mean and variance values. Further, an IIR filter coefficient calculation section updates an IIR filter coefficient to be applied to an IIR mean value calculation section and an IIR variance value calculation section according to a signal value of an image. A parameter for use in the Wiener filter application process is calculated by the IIR filter application process, and a noise reduction (NR) process corresponding to an image signal is implemented by adaptively changing a filter coefficient for use in an IIR application process.

BRIEF DESCRIPTION OF THE DRAWINGS

FIG. 2 is a diagram illustrating a Bayer arrangement and a smoothing processing level for each signal;

FIG. 3 is a diagram illustrating an RGBW arrangement and a smoothing processing level for each signal;

FIGS. 4A and 4B are diagrams illustrating an example of a pixel arrangement when a thinning-out process of halving the number of Cb pixels and the number of Cr pixels is performed when processing of a YCbCr color space is performed;

DETAILED DESCRIPTION OF THE EMBODIMENT(S)

Figure 1:
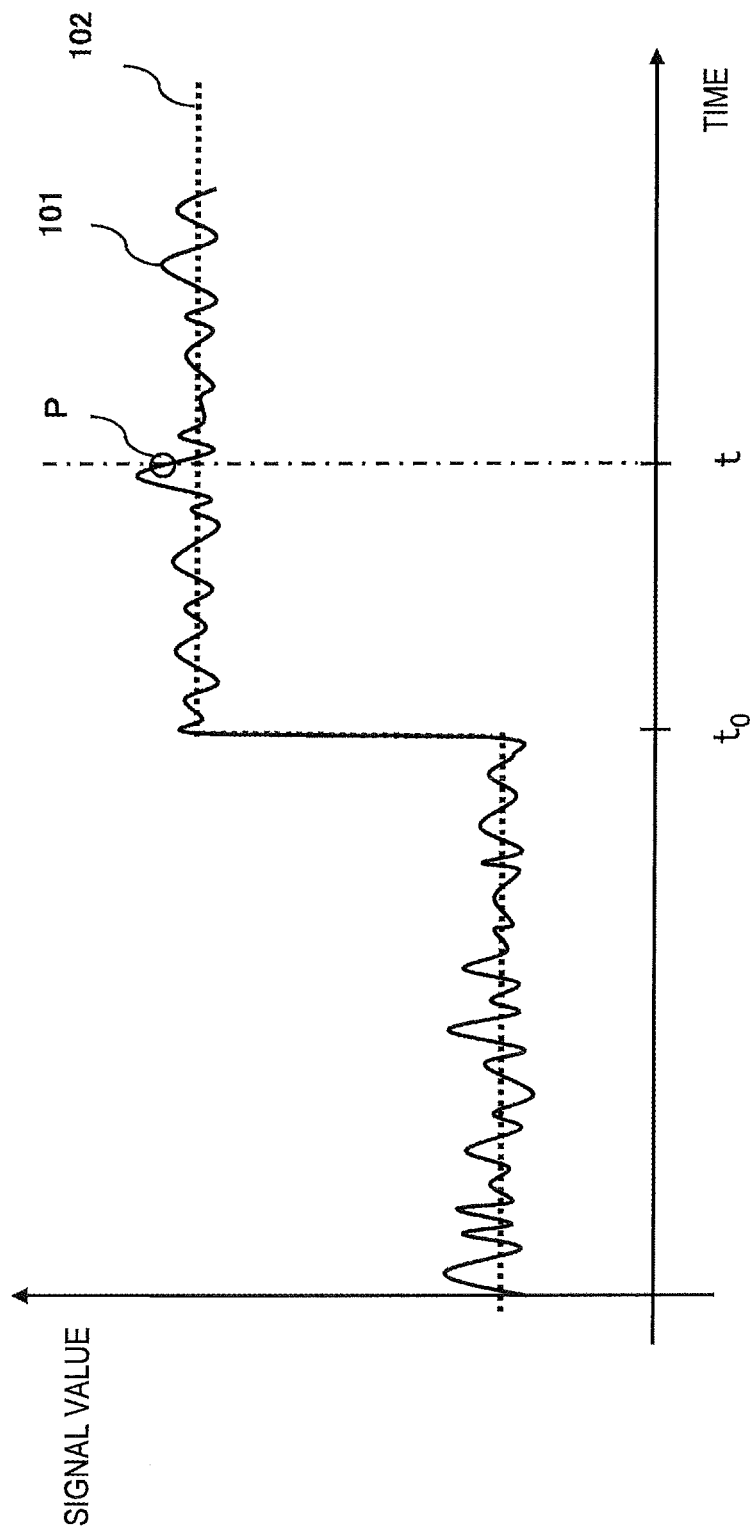
FIG. 1 is a diagram illustrating problems in a process using a combination of a Wiener filter and an IIR filter.

Hereinafter, an image processing apparatus, an image processing method, and a program according to embodiments of the present disclosure will be described in detail with reference to the drawings. Description will be given according to the following items.

1. Details of Signal Processing according to Embodiments of Present Disclosure

2. Configuration and Process of Image Processing Apparatus 2-1. Entire Configuration Example of Image Processing Apparatus 2-2. Entire Operation Example of Image Processing Apparatus 3. Details of Configuration and Process of Signal Processing Section 4. Image Processing Sequence 5. Other Embodiments 6. Summary of Configurations according to Embodiments of Present Disclosure 1. Details of Signal Processing according to Embodiments of Present Disclosure First, signal processing to be executed by the image processing apparatus according to an embodiment of the present disclosure will be described.

According to the embodiment of the present disclosure, the image processing apparatus can receive a signal including predetermined noise, for example, from an image captured by a camera, perform a high-performance edge-preserving smoothing process for the input signal, and generate a noise-reduced image in a small calculation amount and a small-scale circuit.

Although signal processing using an IIR filter is performed to effectively reduce the calculation amount and the circuit scale in the signal processing section of the image processing apparatus according to an embodiment of the present disclosure, for example, the DSP, a process of effectively suppressing a problem of a phase shift of the IIR filter and accurately preserving an edge is implemented.

In addition, when a signal is an image, which is a two-dimensional signal, the circuit scale is further effectively reduced and effective edge preservation is implemented.

In order to solve these problems, the image processing apparatus according to an embodiment of the present disclosure implements an edge-preserving smoothing process based on a Wiener filter and an IIR filter.

In terms of a technique using the Wiener filter in the edge-preserving smoothing process (denoising process), there are a plurality of previous studies including F. Jin, P. Fieguth, L. Winger, and E. Jernigan's "Adaptive Wiener filtering of noisy images and image sequences," Proceedings of the IEEE International Conference on Image Processing, 2003.

It is well-known that a denoising process by the Wiener filter is an optimum filter when a signal serving as a denoising target and noise are subjected to a stationary Gaussian process.

Further, when a signal is subjected to a white Gaussian process, signal processing by the Wiener filter can be expressed by the following Expressions (2).

$$p_{NR}(t) = \beta(t)p(t) + (1-\beta(t))\mu(t) \qquad (2)$$

$$\beta(t) = \frac{\sigma_p^2(t)}{\sigma_p^2(t) + \sigma_n^2(t)}$$

In the above-described Expressions (2), t denotes a time, p(t) denotes a signal value (=a pixel value before correction of a pixel of interest of a correction (NR) target), $p_{NR}(t)$ is a signal value after denoising (=a pixel value after correction of the pixel of interest of a correction (denoising) target), μ(t) is a mean value of an ideal signal that the noise does not overlap, $\sigma_p^2(t)$ denotes a variance value of the ideal signal that the noise does not overlap, and $\sigma_n^2(t)$ denotes a variance value of the noise.

β(t) is a variable of which a range is [0, 1], that is, β=0 to 1, as shown in the above-described expression.

Of course, because it may be impossible to know a value of the ideal signal in advance, it may be impossible to accurately know the values of μ(t) and $\sigma_p^2(t)$.

However, sufficient approximate values of these values can be obtained using the following Expressions (3).

$$\hat{\mu}(t) = \frac{1}{N}\sum_{dt} p(t+dt) \qquad (3)$$

$$\hat{\sigma}_p^2(t) = \frac{1}{N}\sum_{dt}(p(t+dt) - \hat{\mu}(t))^2 - \sigma_n^2(t)$$

In the above-described Expressions (3), t denotes a time, dt denotes an integer having a small value close to 0, t+dt denotes a time close to the time t, N denotes the number of accumulated signal values, μ(^)(t) denotes an approximate value of a mean value of the ideal signal, and $\sigma_p^2$(^)(t) denotes an approximate value of a variance value of the ideal signal.

Note that a symbol [^] shown above characters such as μ, σ, etc., is written after the characters such as μ, σ, etc., for convenience of notation, which means they are written as μ(^), or the like.

The approximate value μ(^)(t) of the mean value of the ideal signal and the approximate value $\sigma_p^2$(^)(t) of the variance value of the ideal signal shown in the above-described Expressions (3) are available as the mean value μ(t) of the ideal signal that the noise does not overlap and the variance value $\sigma_p^2(t)$ of the ideal signal that the noise does not overlap, used in the Wiener filter corresponding to the above Expressions (2). These values μ(^)(t) and $\sigma_p^2$(^)(t) can be calculated using the IIR filter.

Methods of calculating μ(^)(t) and $\sigma_p^2$(^)(t) using the IIR filter are expressed by the following Expressions (4).

$$\hat{\mu}(t) = \gamma(t)p(t) + (1-\gamma(t))\hat{\mu}(t-1)$$

$$\eta(t) = \gamma(t)(p(t))^2 + (1-\gamma(t))\eta(t-1)$$

$$\hat{\sigma}_p^2(t) = (\eta(t) - (\hat{\mu}(t))^2) - \sigma_n^2(t) \qquad (4)$$

In the above-described Expressions (4), η(t) denotes a square mean value for a signal value and γ(t) denotes a coefficient of the IIR filter.

To calculate the above-described Expressions (4), it is desirable to know a signal value p(t) at a current time t and the approximate value μ(^)(t−1) of the mean value of the ideal signal and the square mean value η(t−1) for the signal value at a previous time t−1.

Because the signal value p(t) is a given value at the time t, values that need to be stored in the memory are only the approximate value μ(^)(t−1) of the mean value of the ideal signal and the square mean value η(t−1) for the signal value.

When the number of values that need to be stored is small, a necessary memory becomes small. The number of values to be stored is significantly important for reduction in weight in terms of implementation.

In addition, a calculation amount of Expressions (4) is significantly less than that of the above-described Expressions (3).

This is also significantly important for reduction in weight in terms of implementation.

Although the merit is great when an edge-preserving smoothing process is performed by combining the Wiener filter and the IIR filter, sufficient edge preservation performance is usually not obtained if a parameter used in the above-described Expressions (4), that is, the coefficient γ(t) of the IIR filter, is calculated as a fixed value.

This is because it is assumed that a signal is subjected to a white Gaussian process when the Wiener filter is used as described above with reference to Expressions (2).

For example, the case in which there is a step-shaped change in an input signal as illustrated in FIG. 1 is considered.

An input signal 101 illustrated in FIG. 1 indicates, for example, a pixel value of a certain vertical line of an image signal.

The horizontal axis is a time and the vertical axis is a signal value. For example, when a processing signal is an image, the signal value corresponds to a pixel value such as luminance of one line of the image. The luminance has a large change after/before a time $t_0$. That is, this indicates that there is an edge.

The input signal 101 formed of a solid curve is a signal overlapping noise, and a signal 102 formed of a dotted straight line is an ideal signal excluding noise.

t denotes a current time and $t_0$ denotes a time when a signal changes in a step shape.

Upon correction of a pixel P of interest input at the current time t, if a signal before the time $t_0$ is used to calculate the approximate value μ(^)(t) of the mean value of the ideal signal and the approximate value $\sigma_p^2$(^)(t) of the variance value of the ideal signal used in the Wiener filter, this becomes the calculation using a signal contrary to the white Gaussian process, leading to the degradation of edge preservation performance.

In order to obtain the sufficient performance, a section to be used to calculate μ(^)(t) and $\sigma_p^2$(^)(t) should range from be $t_0$ to t.

That is, a region in which a change of a signal value with a pixel of interest serving as a correction target is small should be selected as a reference pixel region. Specifically, it is preferable to select a signal section that is less than or equal to a preset threshold value.

Although signals at all previous times affect a calculation at the current time in the calculation of the IIR filter, the influence of a previous signal can be controlled by the value of the coefficient γ(t) of the IIR filter. For example, if an image signal having the change of the signal value as illustrated in FIG. 1 is input and the pixel P of interest is corrected, it is effective to eliminate the influence of a signal before the time $t_0$ corresponding to an edge portion. In this case, it is preferable that a value of $\gamma(t_0)$ at the time $t_0$ be 0.

That is, it is preferable that the value of $\gamma(t)$ be adaptively varied according to strength of an edge if the edge-preserving smoothing process is performed by combining the Wiener filter and the IIR filter. It is preferable that the value of $\gamma(t)$ be controlled so that $\gamma(t)$ becomes a value close to 0 if the strength of the edge is strong at the time t and $\gamma(t)$ becomes a value close to 1 if the strength of the edge is weak.

It is possible to effectively apply the edge-preserving smoothing process to an arbitrary one-dimensional signal according to the configuration as described above.

Further, the case in which a signal serving as a target of a denoising process is an image is considered.

Because the image is basically a two-dimensional signal, the Wiener filter should be considered for the two-dimensional signal. As a specific technique, for example, there is a calculation method using pixel values present in an isotropic two-dimensional local region centered on the pixel of interest. However, when image processing uses a delay line as in camera signal processing, the two-dimensional implementation of an isotropic filter is significantly expensive.

This problem is solved by breaking down the filter in horizontal and vertical directions.

In a two-dimensional linear finite impulse response (FIR), a process is horizontally and vertically broken down. It can be seen that the same result as in the two-dimensional linear FIR filter is obtained even when a one-dimensional filter is applied in a different direction after a one-dimensional filter is applied in one direction.

Because there is the Wiener filter using an BR in the technique according to the embodiment of the present disclosure, a processing result of the filter broken down in the horizontal and vertical directions is different from that of the two-dimensional isotropic Wiener filter, but a sufficient approximate value is obtained.

There are the following two types of methods as denoising methods.

(1) The technique according to the embodiment of the present disclosure is applied in both the horizontal and vertical directions.

(2) The technique according to the embodiment of the present disclosure is applied only in one of the horizontal and vertical directions. In the case of the latter method (2), it is preferable to use an isotropic edge-preserving smoothing process for a process of the direction in which the technique according to the embodiment of the present disclosure is not applied.

In general, a process based on an isotropic filter is preferred because a phase shift is conspicuous in image processing.

That is, it is preferable that the technique according to the embodiment of the present disclosure of which implementation cost is low be applied in a direction in which a delay line is necessary, and that isotropic edge-preserving smoothing be one-dimensionally performed in a direction in which no delay line is necessary. Thereby, it is possible to implement an edge-preserving smoothing process having a smaller phase shift than when the technique according to the embodiment of the present disclosure is used in the two directions and lower implementation cost than when the isotropic filter is used in the two directions.

The case in which noise overlaps a color image including a plurality of colors and the noise is removed by applying the technique according to the embodiment of the present disclosure as the edge-preserving smoothing process for an image is considered.

For example, in the case of an RGB image, a process using the same parameter for three images of R, G, and B images is performed as the simplest processing method.

However, it is preferable to separately process noise overlapping luminance and noise overlapping a color difference if a human visual feature is considered.

Human vision is sensitive to changes in luminance, but is insensitive to changes in color difference. Thus, when the noise is removed, it is possible to visually effectively remove noise by applying weak smoothing with respect to the luminance and applying strong smoothing with respect to the color difference.

For example, after the RGB image is converted into a color space expressed by various luminance levels and color differences of a YCbCr color space and a Lab color space, it is effective to perform a process in the type as described above.

That is, when the RGB image is converted into the YCbCr color space, a weak smoothing process is performed for a luminance signal Y and a strong smoothing process is performed for a color difference signal CbCr.

In addition, when the RGB image is converted into the Lab color space, a weak smoothing process is performed for a luminance signal L and a strong smoothing process is performed for a color difference signal ab.

In addition, when an application to the RGB color space is made, it is effective to apply the weak smoothing process to a G signal having a high correlation with the luminance and apply the strong smoothing process to R and B signals having a high correlation with the color difference.

The signal processing section, for example, such as a digital signal processor, which executes signal processing in a general camera, receives and processes a mosaic image from an imaging element, that is, a mosaic image in which only a pixel value of one of RGB is set in each pixel position.

For example, an image obtained from a single-chip imaging element becomes a color mosaic image as illustrated in FIG. 3, which has a Bayer arrangement including an RGB arrangement illustrated in FIG. 2 or a color arrangement formed of RGBW including white (W) through which all light wavelengths pass.

In the case of a color mosaic image, it is general to determine a color arrangement so that a color of which the number of pixels is large becomes a signal having a strong correlation with the luminance and a color of which the number of pixels is small becomes a signal having a strong correlation with the color difference.

It is preferable that the signal processing section (DSP) of the camera apply weak smoothing to a G signal and apply strong smoothing to R and B signals when an input image signal from the imaging element is the Bayer arrangement, for example, illustrated in FIG. 2.

In the case of the RGBW arrangement illustrated in FIG. 3, it is preferable that the weak smoothing be applied to a W signal and the strong smoothing be applied to R, G, and B signals.

It is possible to perform visually effective NR by performing a process according to a color signal as described above.

In the camera, processing of a YCbCr color space is configured to be performed, but the number of Cb pixels and the number of Cr pixels are halved by a thinning-out process using the fact that vision is insensitive to the color difference.

Figures 4A, 4B:
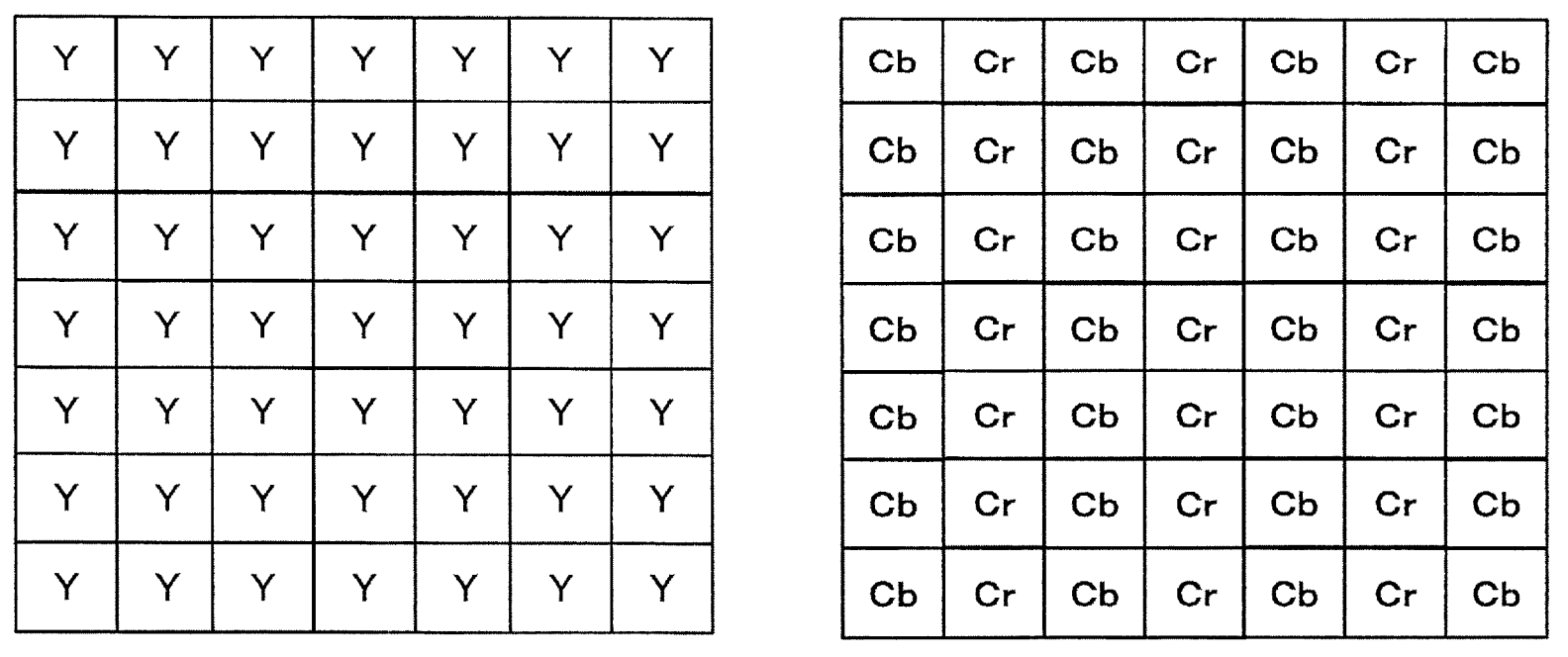

In this case, from the merit of convenience on the signal processing, for example, a luminance signal Y and color difference signals Cb and Cr in which Y is set to have pixel values for all pixels as illustrated in FIG. 4(a) and Cb and Cr are set to have data alternately in a horizontal direction as illustrated in FIG. 4(b) are generated and processed.

As in the CbCr image illustrated in FIG. 4(b) having data alternately in the horizontal direction and the color mosaic images illustrated in FIGS. 2 and 3, the edge-preserving smoothing process based on the camera signal processing using a delay line may be performed for an image in which different colors are regularly arranged in one image.

That is, a process is performed using pixel values retained in a line memory by reading and receiving pixel values from an imaging element in order of raster scanning from a higher-order line and retaining pixel values of a row (delay line) before a current read row (line) in the line memory.

Camera signal processing using the delay line is based on a sliding window type of process, and pixels are processed one by one in order of raster scanning.

That is, a certain circuit performs processing for one color at certain timing.

When a processing type as described above is taken, the same circuit can be shared by time division if different colors are regularly arranged within an input image.

An example of processing of the CbCr image illustrated in FIG. 4(b) will be described.

Because the processing is performed using only pixels having the same color in the typical isotropic edge-preserving smoothing process performed in the horizontal direction, pixel values are referred to at one-pixel intervals in setting illustrated in FIG. 4(b).

Because a reference pattern does not change even when the color of the pixel of interest is Cb or Cr or the calculation of the same content is entirely performed, the same circuit can be shared between Cb and Cr.

Because the CbCr image illustrated in FIG. 4(b) has the same color in the vertical direction when the edge-preserving smoothing process is performed according to a process of an embodiment of the present disclosure in the vertical direction, the process is the same as when the present disclosure is applied to a one-dimensional signal described so far.

To carry out a calculation of the IIR filter, a mean value of pixel values calculated in a position of a previous pixel in the vertical direction and a square mean value of pixel values are necessary.

Although reference positions of a memory in which these values are retained vary with a position of a pixel serving as a denoising target, the same circuit can be shared between Cb and Cr because there is no change in any pixel position in relation to other calculations.

If the regularity of the color arrangement is used well even in the image illustrated in FIG. 2 or 3, the process can be shared between different colors as in the case of FIG. 4B.

As described above, the same circuit is shared between different colors by time division using regularly arranged colors, so that the circuit scale can be reduced.

2. Configuration and Process of Image Processing Apparatus

Hereinafter, the configuration and process of the imaging apparatus (digital still camera) will be described as an embodiment of the image processing apparatus according to the present disclosure.

The entire configuration and operation will first be described and then the configuration and operation of each part will be described. Finally, variations of embodiments of the present disclosure capable of being derived from this embodiment will be described.

(2-1. Entire Configuration Example of Image Processing Apparatus)

Figure 5:
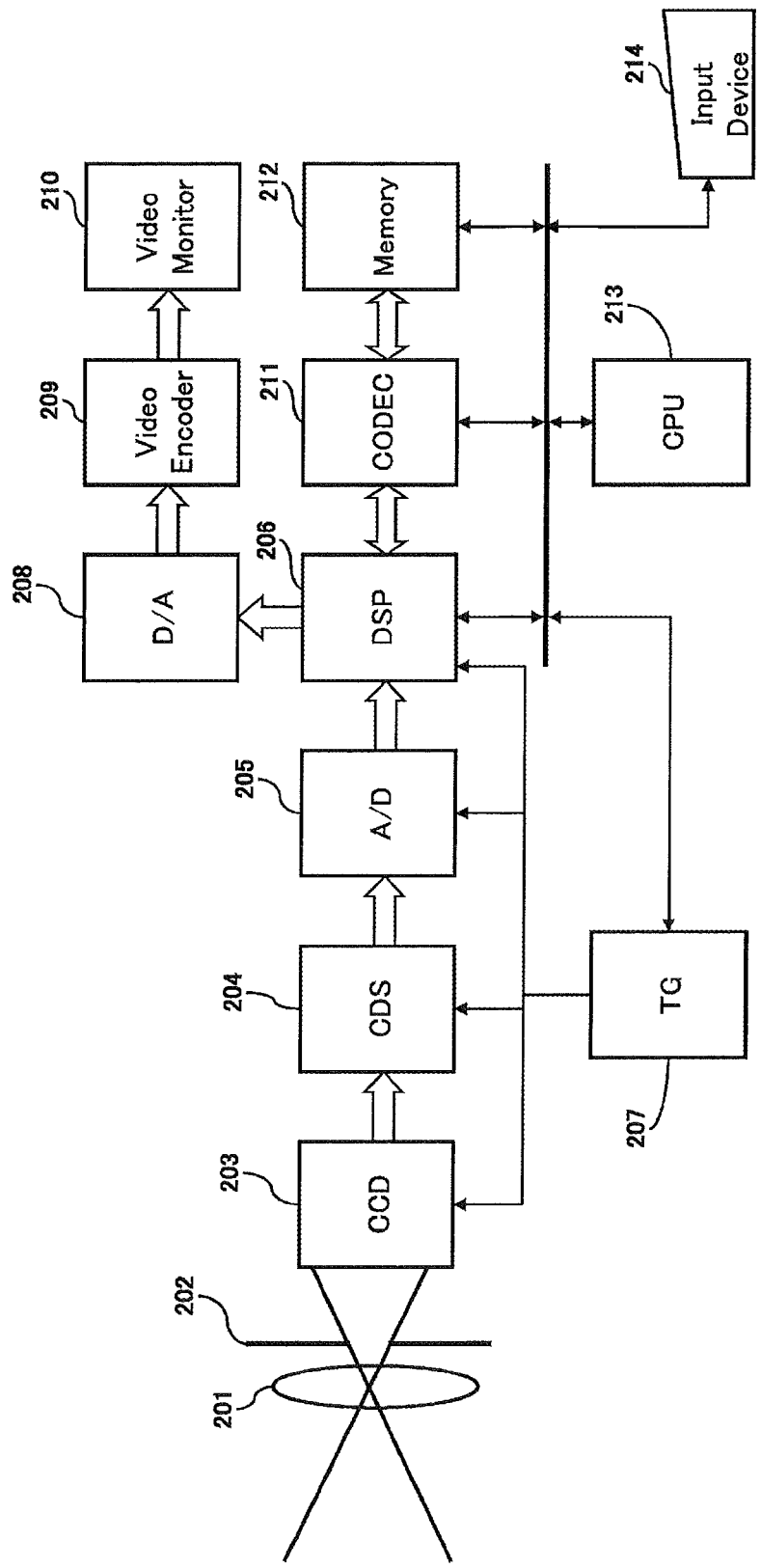
FIG. 5 is a diagram illustrating a configuration and process of an imaging apparatus, which is an image processing apparatus according to an embodiment of the present disclosure.

FIG. 5 is a block diagram illustrating a configuration of an imaging apparatus (digital still camera), which is an embodiment of an image processing apparatus according to the present disclosure.

As illustrated in FIG. 5, the imaging apparatus has a lens 201, a diaphragm 202, an imaging element 203, for example, including a charge-coupled device (CCD) image sensor and the like, a correlated double sampling (CDS) circuit 204, an analog-to-digital (A/D) converter 205, a signal processing section (DSP) 206, a timing generator (TG) 207, a digital-to-analog (D/A) converter 208, a video encoder 209, a video monitor 210, a coder-decoder (CODEC) 211, a memory 212, a central processing unit (CPU) 213, and an input device 214.

Here, the input device 214 includes operation buttons such as a record button in a camera main body. In addition, the signal processing section (DSP) 206 is a block having a processor for signal processing and an image random access memory (RAM). The processor for signal processing can perform image processing previously programmed for image data stored in the image RAM. Hereinafter, the signal processing section (DSP) 206 may be simply referred to as the DSP 206.

(2-2. Entire Operation Example of Image Processing Apparatus)

Hereinafter, the entire operation example of the imaging apparatus of this embodiment will be described.

Incident light, which passes through an optical system of the lens 201 and the like and reaches the imaging element 203, reaches each light-receiving element, for example, on a CCD imaging surface constituting the imaging element 203, and is converted into an electrical signal according to photoelectrical conversion by the light-receiving element.

After the electrical signal output from the imaging elements 202 is subjected to initial denoising by the CDS circuit 204 and digitally converted by the A/D converter 205, the converted signal is temporarily stored in an image memory of the signal processing section (DSP) 206.

The TG 207 controls a signal processing system so that an image capture is maintained at a fixed frame rate in a state during imaging. After a pixel stream is sent to the signal processing section (DSP) 206 at a fixed rate and subjected to appropriate image processing, image data is sent to the D/A converter 208, the CODEC 211, or both thereof.

The D/A converter 208 converts image data sent from the signal processing section (DSP) 206 into an analog signal, the video encoder 209 converts the analog signal into a video signal, and the video monitor 210 can monitor the video signal. The video monitor 210 functions as a finder of the camera in this embodiment.

In addition, the CODEC 211 encodes image data sent from the signal processing section (DSP) 206 and the encoded image data is recorded on the memory 212. Here, the memory 212 may be a recording device using a semiconductor, a magnetic recording medium, a magneto-optical recording medium, an optical recording medium, or the like.

The above is the description of the entire system of the imaging apparatus of this embodiment.

3. Details of Configuration and Process of Signal Processing Section

In the configuration of the imaging apparatus illustrated in FIG. 5, for example, the signal processing section (DSP) 206 executes signal processing described in the previous item [1. Details of Signal Processing according to Embodiments of Present Disclosure].

Hereinafter, an example of the signal processing executed in the signal processing section (DSP) 206 will be described in detail.

The signal processing section (DSP) 206 sequentially executes a calculation operation described in a predetermined program code using a calculation unit, for example, for an input signal stream to the signal processing section (DSP) 206.

In the following description, each processing unit of the program is described as a functional block, and a sequence to be executed by each process is described in a flowchart. However, the signal processing can be implemented by mounting a hardware circuit, which implements the same processing as a functional block as will be described later, in addition to a type of program described in this embodiment. The configuration suitable for mounting as the hardware circuit will be described together in this embodiment.

Figure 6:
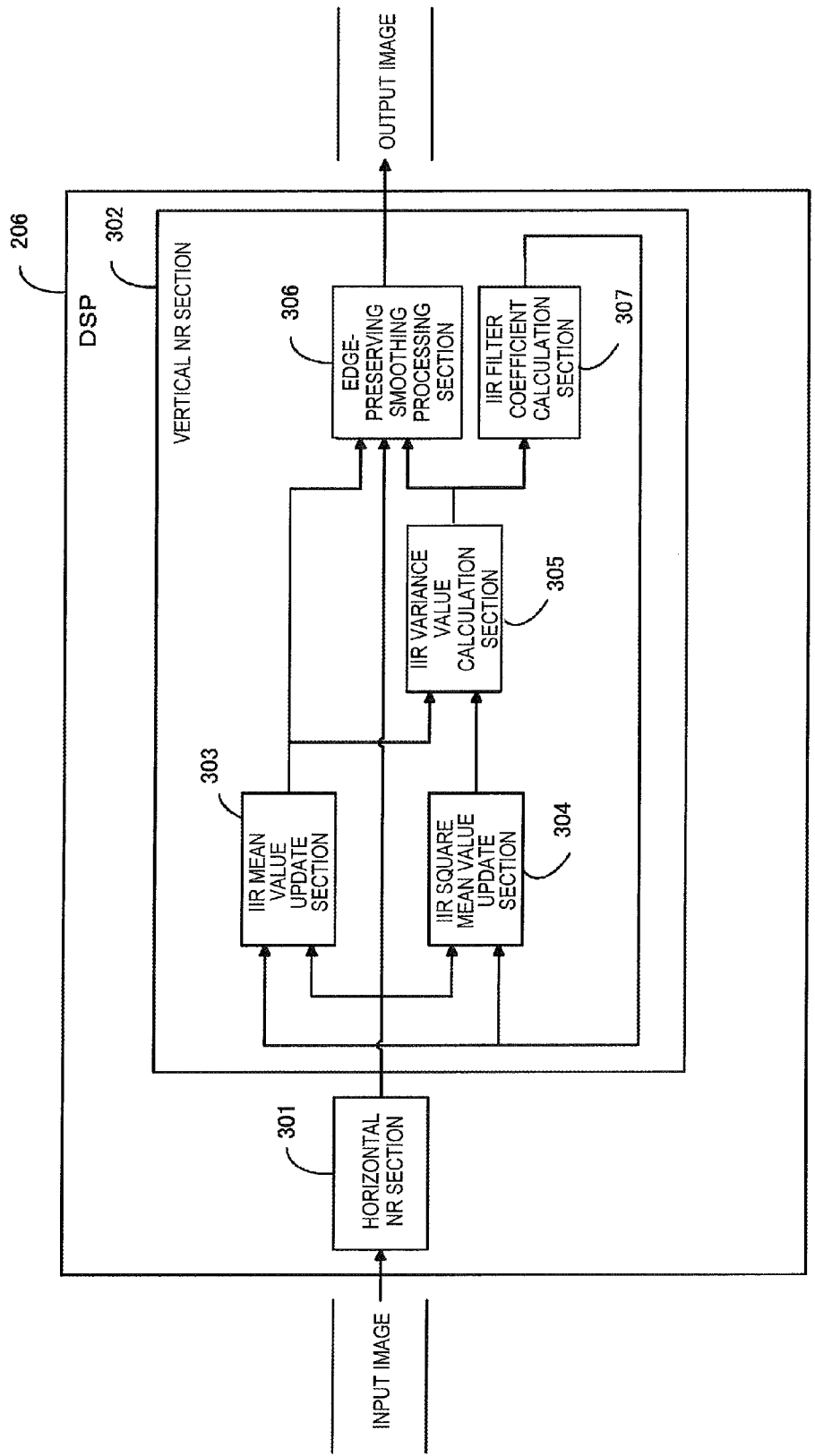
FIG. 6 is a diagram illustrating an NR processing configuration of a signal processing section (digital signal processor (DSP))

FIG. 6 is a block diagram of the signal processing section (DSP) 206 in which each function to be executed in the signal processing section (DSP) 206 is illustrated as a block.

Although various signal processing operations are generally executed in the signal processing section (DSP) of the imaging apparatus, only a processing configuration related to an NR process according to an embodiment of the present disclosure is illustrated in FIG. 6.

Hereinafter, an example in which noise overlapping the CbCr image illustrated in FIG. 4(b) is removed using the edge-preserving smoothing process will be described.

As illustrated in FIG. 6, the NR process to be executed in the signal processing section (DSP) 206 is roughly divided into two processes.

The first process is based on a horizontal NR section 301, in which a denoising process of the horizontal direction is performed for an input image, and the second process is based on a vertical NR section 302, in which a denoising process of the vertical direction is performed.

The input image is input from the A/D conversion section 205 illustrated in FIG. 5, and a digital signal value (pixel value) is input in order of raster scanning. Specifically, for example, pixel values are input from a higher-order row in a direction from left to right.

The pixel values of the input image are first input to the horizontal NR section 301 and subjected to the denoising process of the horizontal direction.

The horizontal NR section 301 is described, for example, as using the edge-preserving smoothing process with an isotropic filter of the related art.

When the one-dimensional bilateral filter is used as an example in which the horizontal NR section 301 is executed, pixel-value conversion according to the following Expressions (5) is executed.

$$w_x(dx) = \frac{1}{\sqrt{2\pi}\,\sigma_x} e^{-\frac{dx^2}{2\sigma_x^2}}$$

$$w_p(x, y, dx) = \frac{1}{\sqrt{2\pi}\,\sigma_p} e^{-\frac{(p(x,y)-p(x+dx,y))^2}{2\sigma_c^2}}$$

$$w(x, y, dx) = w_x(dx) w_p(x, y, dx)$$

(5)

-continued $$p_{HNR}(x, y) = \frac{\sum_{dx} w(x, y, dx) p(x + dx, y)}{\sum_{dx} w(x, y, dx)}$$

In the above-described Expressions (5), x denotes a pixel position of the horizontal direction and y denotes a pixel position of the vertical direction.

dx is a variable having an even value.

p(x, y) denotes a pixel value before the denoising process, and $p_{NHR}(x, y)$ denotes a pixel value after the denoising process of the horizontal direction.

Here, pixel values of two different colors of Cb and Cr are expressed using p(x, y) and $p_{NHR}(x, y)$ without distinction.

$w_x(dx)$ is a weight function applied in a space direction, and $w_p(x, y, dx)$ is a weight function applied in a pixel-value direction.

The two functions are Gaussian functions, and a range of effect of a weight is controlled by a standard deviation $\sigma_x$ and a standard deviation $\sigma_p$, and serve as parameters for varying the strength of smoothing.

For example, by the process according to the above-described Expressions (5), a pixel subjected to the denoising process of the horizontal direction is input to the vertical NR section 302. The vertical NR section 302 performs the denoising process of the vertical direction for the image subjected to the denoising process of the horizontal direction by the horizontal NR section 301.

The vertical NR section 302 illustrated in FIG. 6 has the following elements:

an IIR mean value update section 303, which calculates a mean value of pixel values of reference pixels around a correction target pixel according to an IIR filter application process;

an IIR square mean value update section 304, which calculates a square mean value of the signal values of the reference pixels around the correction target pixel according to the IIR filter application process;

an IIR variance value calculation section 305, which calculates a variance value of the signal values of the reference pixels around the correction target pixel according to the IIR filter application process;

an edge-preserving smoothing processing section 306, which receives the mean and variance values of the reference pixels and executes the edge-preserving smoothing process according to a Wiener filter application process; and an IIR filter coefficient calculation section 307, which updates an IIR filter coefficient to be applied to the IIR mean value update section 303 and the IIR square mean value update section 304 according to the signal values of the reference pixels.

The IIR mean value update section 303 calculates a vertical-direction mean value $\hat{\mu}(x,y)$ of the pixel values by the IIR filter according to the following Expression (6).

$$\hat{\mu}(x,y) = \gamma(x,y) p_{HNR}(x,y) + (1-\gamma(x,y))\hat{\mu}(x,y-1)$$ (6)

In the above-described Expression (6), γ(x, y) is an IIR filter coefficient.

For an initial value of the vertical-direction mean value $\hat{\mu}(x,y)$ of the pixel values, it is preferable that a pixel value $p_{HNR}(x, 0)$ after denoising of the horizontal direction of a position (y=0) calculated by the horizontal NR section 301 according to the above-described Expressions (5) be used.

The above-described Expression (6) corresponds to the calculation expression of the approximate value $\mu(\hat{\,})(t)$ of the mean value of the ideal signal of the above-described Expressions (4).

That is, the IIR mean value update section 303 illustrated in FIG. 6 calculates the approximate value $\mu(\hat{\,})(t)$ of the mean value of the ideal signal using the Wiener filter application process (corresponding to Expressions (2)) to be executed by the subsequent-stage edge-preserving smoothing processing section 306 as an IIR mean value using the IIR filter, and outputs the calculated value to the subsequent-stage edge-preserving smoothing processing section 306.

The calculated value is also provided to the IIR variance value calculation section 305.

According to the following Expression (7), the IIR square mean value update section 304 calculates a vertical-direction square mean value $\eta(x, y)$ of pixel values by the IIR filter.

$$\eta(x,y)=\gamma(x,y)(p_{HNR}(x,y))^2+(1-\gamma(x,y))\eta(x,y-1) \quad (7)$$

In the above-described Expression (7), $\gamma(x, y)$ is an IIR filter coefficient.

For an initial value of the vertical-direction square mean value $\eta(x, y)$ of the pixel values, it is preferable that $p_{HNR}(x, 0)^2$ calculated using a pixel value $p_{HNR}(x, 0)$ after denoising of the horizontal direction of a position (y=0) calculated according to the above-described Expressions (5) in the horizontal NR section 301 be used.

The above-described Expression (7) corresponds to a calculation expression of the square mean value $\eta(t)$ for the signal value of the above-described Expressions (4).

The IIR square mean value update section 304 illustrated in FIG. 6 calculates the square mean value $\eta(t)$ for the signal value illustrated in Expressions (4) necessary to calculate the approximate value $\sigma_p^2(\hat{\,})(t)$ of the variance value of the ideal signal used in the Wiener filter application process (corresponding to Expressions (2)) executed by the subsequent-stage edge-preserving smoothing processing section 306, and outputs the calculated value to the subsequent-stage IIR variance value calculation section 305 illustrated in FIG. 6.

In terms of the coefficient $\gamma(x, y)$ of the IIR filter used in the above-described Expressions (6) and (7), as described above with reference to Expressions (4), for example, a value of $\gamma(x, y)$ is controlled so that $\gamma(x, y)$ is designated as a value close to 0 if the strength of the edge of the vertical direction is strong and designated as a value close to 1 if the strength of the edge is weak. Although any method may be used to obtain $\gamma(x, y)$, several examples will be described later.

The IIR variance calculation section 305 illustrated in FIG. 6 receives the vertical-direction mean value $\mu(\hat{\,})(x, y)$ of the pixel values calculated by the IIR mean value update section 303 according to the above-described Expression (6) and the vertical-direction square mean value $\eta(x, y)$ of the pixel values calculated by the IIR square mean value update section 304 according to the above-described Expression (7), and calculates the vertical-direction variance value $\sigma_p^2(\hat{\,})(x, y)$ of the pixel values according to the following Expression (8).

$$\hat{\sigma}_p^2(x,y)=(\eta(x,y)-(\hat{\mu}(x,y))^2)\sigma_n^2(x,y) \quad (8)$$

Although $\sigma_n^2(x, y)$ denotes a variance value of noise in the above-described Expression (8), it is preferable that a uniform fixed value throughout the screen be given. Of course, if there is prior knowledge regarding the feature of noise overlapping Cb and Cr, it is more preferable that $\sigma_n^2(x, y)$ be adaptively varied according to a pixel position. The prior knowledge is, for example, about a degree of variance of noise for pixel values of Cb and Cr.

The above-described Expression (8) corresponds to the calculation expression of the approximate value $\sigma_p^2(\hat{\,})(t)$ of the variance value of the ideal signal in the above-described Expressions (4).

That is, the IIR variance value calculation section 305 illustrated in FIG. 6 calculates the approximate value $\sigma_p^2(\hat{\,})(x, y)$ of the variance value of the ideal signal using the Wiener filter application process (corresponding to Expressions (2)) to be executed by the subsequent-stage edge-preserving smoothing processing section 306 as an IIR variance value using the IIR filter, and outputs the calculated value to the subsequent-stage edge-preserving smoothing processing section 306.

The calculated value is also provided to the IIR filter coefficient calculation section 307.

The edge-preserving smoothing processing section 306 receives the output $p_{HNR}(x, y)$ of the horizontal NR section 301, the vertical-direction mean value $\mu(\hat{\,})(x, y)$ of the pixel values calculated by the IIR mean value update section 303 according to the above-described Expression (6) and the IIR variance value $\sigma_p^2(\hat{\,})(x, y)$ of the pixel values calculated by the IIR variance value calculation section 305 according to the above-described Expression (8) to perform the edge-preserving smoothing process of the vertical direction and remove noise of the vertical direction.

The edge-preserving smoothing process of the vertical direction is expressed by the following Expressions (9).

$$p_{NR}(x, y) = \beta(x, y)p_{HNR}(x, y) + (1 - \beta(x, y))\hat{\mu}(x, y) \quad (9)$$

$$\beta(x, y) = \frac{\hat{\sigma}_p^2(x, y)}{\hat{\sigma}_p^2(x, y) + \sigma_n^2(x, y)}$$

In the above-described Expressions (9), $\mu(\hat{\,})(x, y)$ denotes an output of the IIR mean value update section 303 and $p_{NR}(x, y)$ denotes a pixel value after denoising of the vertical direction.

$\beta(x, y)$ is a variable of which a range is [0, 1], that is, 0=0 to 1, as shown in the above-described expressions.

$\mu(\hat{\,})(x, y)$ is an output of the IIR variance value calculation section 305.

The above-described Expressions (9) correspond to signal processing by the same Wiener filter as in the above-described Expressions (2).

The edge-preserving smoothing processing section 306 receives the output $p_{HNR}(x, y)$ of the horizontal NR section 301, the vertical-direction mean value $\mu(\hat{\,})(x, y)$ of the pixel values calculated by the IIR mean value update section 303 according to the above-described Expression (6), and the IIR variance value $\sigma_p^2(\hat{\,})(x, y)$ of the pixel values calculated by the IIR variance value calculation section 305 according to the following Expression (8) to execute the edge-preserving smoothing process of the vertical direction according to signal processing by the Wiener filter and remove noise of the vertical direction.

That is, for example, the edge-preserving smoothing processing section 306 calculates a signal value after correction of a correction target pixel by a process of blending the mean value generated by the IIR mean value update section 303 and the signal value of the correction target pixel according to the variance value calculated by the IIR variance value calculation section 305.

For the process of blending the mean value generated by the IIR mean value update section 303 and the signal value of the correction target pixel, types of specific blend processes are as follows.

When a variance value calculated by the IIR variance value calculation section 305 is v1 and a parameter by which the strength of edge-preserving smoothing is controlled is v2, a blend process in which a blend rate is set to (v1−v2)/v2 is executed.

Alternatively, when the variance value calculated by the IIR variance value calculation section 305 is v1 and the parameter by which the strength of edge-preserving smoothing is controlled is v2, a blend process in which a blending rate is set to v1/(v1+v2) is executed.

A correction pixel value is calculated by the above-described types of blend processes.

The IIR filter coefficient calculation section 307 receives the IIR variance value $\sigma_p^2(\hat{\ })(x, y-1)$ calculated by the IIR variance value calculation section 305 according to the above-described Expression (8), and calculates an IIR filter coefficient $\gamma(x, y)$ on the basis of edge strength. Here, $\gamma(x, y)$ is calculated according to the following Expression (10) using the vertical-direction variance value calculated in the pixel position of (x, y−1) as an index of the edge strength.

$$\gamma(x,y) = \min(s\hat{\sigma}_p^2(x,y-1),1) \tag{10}$$

In the above-described Expression (10), s is a tuning parameter by which sensitivity to an edge is controlled.

The IIR filter coefficient $\gamma(x, y)$ calculated by the IIR filter coefficient calculation section 307 according to the above-described Expression (10) is provided to the IIR mean value update section 303 and the IIR square mean value update section 304 illustrated in FIG. 6.

In the IIR mean value update section 303, the IIR mean value $\mu(\hat{\ })(x, y)$ is calculated by applying a newly calculated IIR filter coefficient $\gamma(x, y)$ according to the above-described Expression (6).

In the IIR square mean value update section 304, an IIR square mean value $\eta(x, y)$ is calculated by applying the newly calculated IIR filter coefficient $\gamma(x, y)$ according to the above-described Expression (7).

The above-described Expression (10) is an example in which the IIR filter coefficient $\gamma(x, y)$ is obtained.

As a process of obtaining the IIR filter coefficient $\gamma(x, y)$, the following process is possible.

For example, a process using a difference between a pixel value and a mean value of pixel values is applicable as shown in the following Expression (11).

$$\gamma(x,y) = \min(t|p_{HNR}(x,y) - \hat{\mu}(x,y-1)|,1) \tag{11}$$

In the above-described Expression (11), t is a tuning parameter by which sensitivity to an edge is controlled.

In addition, a process using a pixel value difference between adjacent pixels as shown in the following Expression (12) is possible.

$$\gamma(x,y) = \min(u|p_{HNR}(x,y) - p_{HNR}(x,y-1)|,1) \tag{12}$$

In the above-described Expression (12), u is a tuning parameter by which sensitivity to an edge is controlled.

As described above, various methods are considered as a process of obtaining the IIR filter coefficient $\gamma(x, y)$.

As described above, the IIR filter coefficient calculation section 307 can be set to sequentially calculate an IIR filter coefficient in various types of processes including:

a process of sequentially calculating a new IIR filter coefficient according to a variance value calculated by the IIR variance value calculation section, a process of sequentially calculating a new IIR filter coefficient based on a difference between a signal value of a correction target pixel and a mean value calculated by the IIR mean value calculation section, and a process of sequentially calculating a new IIR filter coefficient based on a difference between the signal value of the correction target pixel and a signal value of a previous input pixel.

When the above-described Expression (11) or (12) is used, it is preferable that a change be made so that a signal input to the IIR filter coefficient calculation section 307 is necessary in Expression (11) or (12).

As described above, there are various methods of obtaining the IIR filter coefficient $\gamma(x, y)$. Although only a signal previous to the pixel position (x, y−1), that is, a signal previous to $p_{HNR}(x, y)$, among outputs of the horizontal NR section 301 is used in the case of Expression (10), a current signal $p_{HNR}(x, y)$ may be included as shown in Expression (11) or (12).

According to the above-described embodiment, it is possible to remove noise overlapping a CbCr image illustrated in FIG. 4B using the edge-preserving smoothing process.

Although an example of a process only in the vertical direction has been described in the example of the process described with reference to FIG. 6, the same process may be configured to be applied to one or both of the horizontal direction and the vertical direction.

In addition, a luminance signal image and a color signal image may be separately input as a processing target image, and a process in which the strength of edge-preserving smoothing is changed may be configured to be executed.

Figure 7:
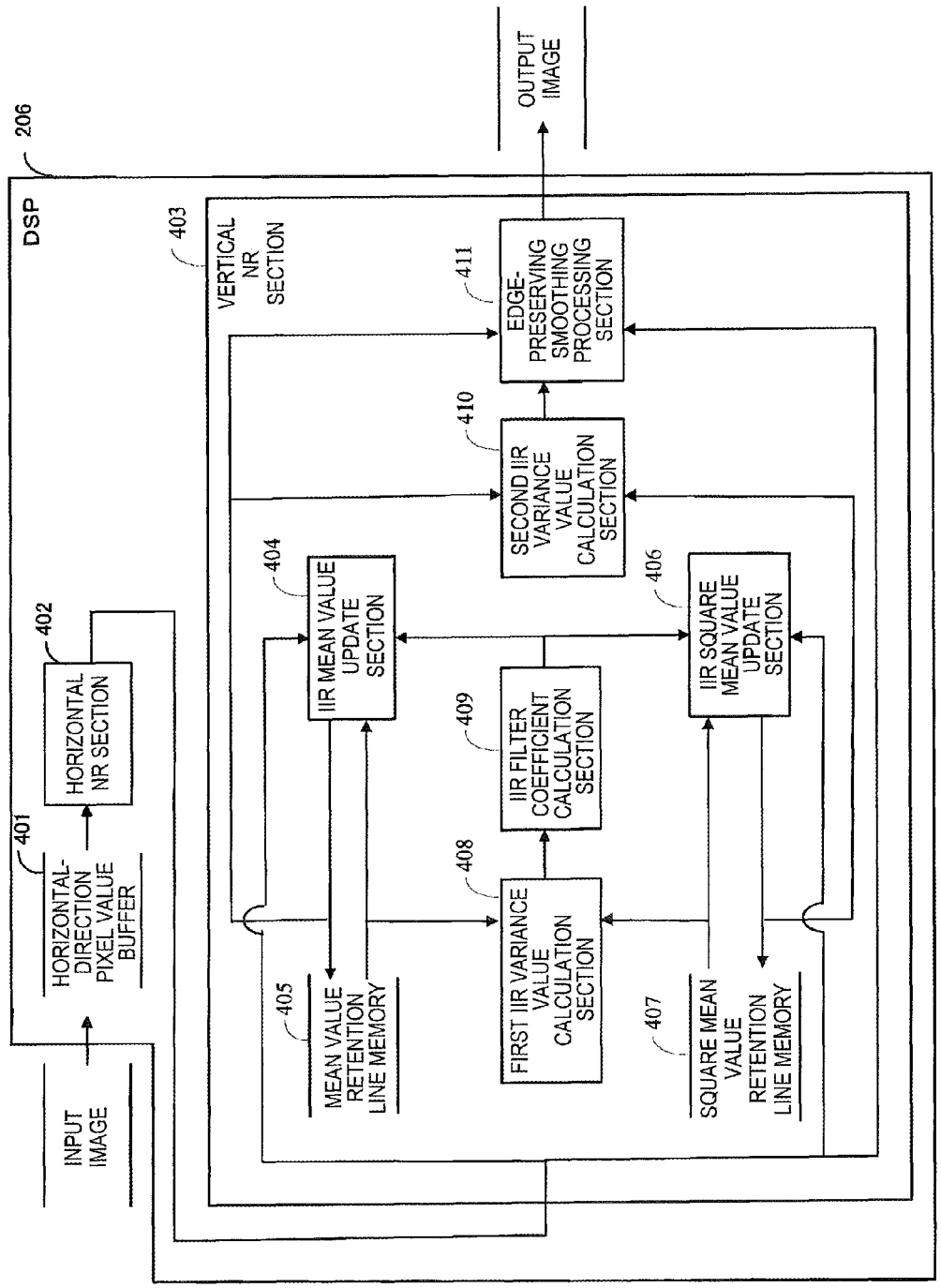
FIG. 7 is a diagram illustrating an NR processing configuration of the signal processing section (DSP)

Although the edge-preserving smoothing process for the CbCr image has been described on the basis of the overall view illustrated in FIG. 6 so far, a configuration suitable for implementation in a type suitable for camera signal processing is illustrated in FIG. 7.

FIG. 7 is a diagram in which memory sections are illustrated. That is, the memory sections are a horizontal-direction pixel value buffer 401 set in a previous stage of the horizontal NR section 402, a mean value line memory 405, which is set in correspondence with the IIR mean value update section 404 and retains an IIR mean value, and a square mean value retention line memory 407, which is set in correspondence with the IIR square mean value update section 406 and retains an IIR square mean value.

Because a memory size dominantly determines a circuit scale in camera signal processing, it is preferable to use a configuration that reduces a memory use amount.

Pixels of an input image are assumed to be input one by one in order of raster scanning.

The input pixels are buffered by the number of pixels necessary for a process of the horizontal NR section 402 using the horizontal-direction pixel value buffer 401.

This delay process of the horizontal direction can be implemented by a small-scale circuit.

Content of processing performed by the horizontal NR section 402 is the same as that of processing performed by the horizontal NR section 301 described above with reference to FIG. 6.

Compared to the vertical NR section 302 described above with reference to FIG. 6, the vertical NR section 403 further includes a processing block that calculates a variance value.

That is, a first IIR variance value calculation section 408 and a second IIR variance value calculation section 410 are provided.

The reason for this is as follows.

In the configuration of the vertical NR section 302 described with reference to FIG. 6, an IIR filter coefficient calculated in a pixel position (x, y−1) needs to be preserved in a memory until the vertical-direction edge-preserving smoothing process is performed in a pixel position (x, y).

That is, the IIR filter coefficient calculation section 307 illustrated in FIG. 6 receives an IIR variance value $\sigma_p^2(\hat{\ })(x, y-1)$ calculated by the IIR variance value calculation section 305 according to the above-described Expression (8), and calculates an IIR filter coefficient $\gamma(x, y)$ based on edge strength. For example, the IIR filter coefficient $\gamma(x, y)$ is calculated according to the above-described Expression (10) using a variance value calculated in the pixel position $(x, y-1)$ as an edge strength index.

To perform this process, the IIR filter coefficient calculated in the pixel position $(x, y-1)$ needs to be preserved in the memory until the vertical-direction edge-preserving smoothing process is performed in the pixel position $(x, y)$.

In the configuration illustrated in FIG. 7, the first IIR variance value calculation section 408 is configured to calculate a variance value $\sigma_p^2(\hat{\ })(x, y-1)$ in the pixel position $(x, y-1)$ and provide the calculated variance value to the IIR filter coefficient calculation section 409 without using a separate memory storing the IIR filter coefficient calculated in the pixel position $(x, y-1)$.

That is, the first IIR variance value calculation section 408 calculates the variance value $\sigma_p^2(\hat{\ })(x, y-1)$ in the pixel position $(x, y-1)$ and provides the calculated variance value to the IIR filter coefficient calculation section 409.

The second IIR variance value calculation section 410 calculates a variance value $\sigma_p^2(\hat{\ })(x, y)$ in the pixel position $(x, y)$ and provides the calculated variance value to the edge-preserving smoothing processing section 411.

The memory is reduced in the configuration as described above.

As described above, a circuit scale is reduced as a configuration in which one variance value calculation block is added, and the IIR filter coefficient supposed to be calculated in $(x, y-1)$ is calculated in $(x, y)$.

Processing content of the IIR mean value update section 404 is the same as that of the IIR mean value update section 303 described above with reference to FIG. 6. To calculate a mean value in the pixel position $(x, y)$, a mean value in the pixel position $(x, y-1)$ is necessary.

To retain a mean value preceding by one pixel in the vertical direction as described above, the mean value retention line memory 405 is used.

Processing content of the IIR square mean value update section 406 is the same as that of the IIR square mean value update section 304 described above with reference to FIG. 6.

To calculate a square mean value in a pixel $(x, y)$, a square mean value in a pixel $(x, y-1)$ is necessary.

To retain a square mean value preceding by one pixel in the vertical direction as described above, the square mean value retention line memory 407 is used.

Processing content of the first IIR variance value calculation section 408 is the same as that of the IIR variance value calculation section 305 described above with reference to FIG. 6.

Processing content of the IIR filter coefficient calculation section 409 is the same as that of the IIR filter coefficient calculation section 307 described above with reference to FIG. 6.

Processing content of the second IIR variance value calculation section 410 is the same as that of the IIR variance value calculation section 305 described above with reference to FIG. 6.

Processing content of the edge-preserving smoothing processing section 411 is the same as that of the edge-preserving smoothing processing section 306 described above with reference to FIG. 6.

According to the configuration of FIG. 7, a large-capacity memory becomes only a line memory necessary to retain a vertical-direction mean value $\mu(\hat{\ })(x, y)$ of pixel values and a vertical-direction square mean value $\eta(x, y)$ of the pixel values.

Because implementation is sufficiently possible if the mean value of the pixel values has the same word length as the pixel value and implementation is sufficiently possible if the square mean value of the pixel values has a word length twice that of the pixel value, a line-memory circuit scale corresponds to three delay lines in camera signal processing.

This is a reasonable scale for a circuit scale of the entire camera signal processing.

In addition, a circuit scale in a calculation section is more likely to be decreased as compared to the case in which a two-dimensional isotropic filter is used.

This is because when peripheral pixels to be used in an edge-preserving smoothing process for one pixel are located in a local region of N horizontal pixels and N vertical pixels, the order of the calculation amount of a two-dimensional filter becomes $O(N^2)$, but the order of a calculation amount of a filter separated in two horizontal and vertical directions becomes $O(N)$ according to an embodiment of the present disclosure.

4. Image Processing Sequence

Next, a processing sequence to be executed by the signal processing section (DSP) 206 of the imaging apparatus illustrated in FIG. 5 will be described with reference to the flowchart illustrated in FIG. 8.

Figure 8:
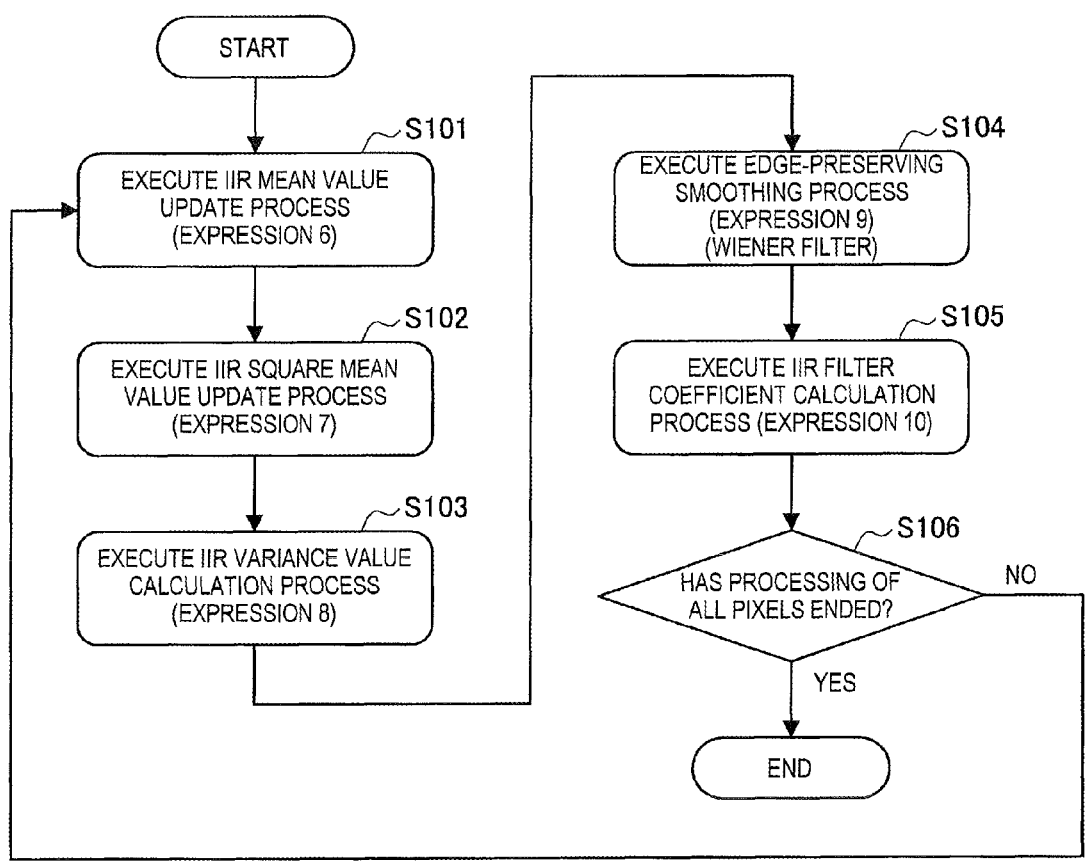
FIG. 8 is a flowchart illustrating a sequence of an NR process of the signal processing section (DSP).

The process of the flowchart illustrated in FIG. 8 is executed in the signal processing section (DSP) 206 of the imaging apparatus illustrated in FIG. 5.

For example, a calculation unit of the CPU of the DSP 206 sequentially executes a calculation operation on a stream of an input image signal according to a program stored in a memory, so that the process is performed.

A process of steps of the flow illustrated in FIG. 8 will be described.

First, in step S101, an IIR mean value update process is executed.

This process is executed, for example, by the IIR mean value update section 303 illustrated in FIG. 6.

The IIR mean value update section 303 calculates a mean value $\mu(\hat{\ })(x, y)$ of pixel values by the IIR filter according to the above-described Expression (6).

Although a process described with reference to FIG. 6 has been described as a configuration example in which the vertical NR section 302 performs a process for pixels of the vertical direction, an NR process to be executed as a denoising process is executable as a process corresponding to a pixel arrangement or a pixel input sequence and also executable as a process for the horizontal direction as well as the vertical direction. The NR process is described as a process not limited to the direction in the description of the flow illustrated in FIG. 8.

Next, in step S102, the IIR square mean value update process is executed.

This process is executed, for example, by the IIR square mean value update section 304 illustrated in FIG. 6.

The IIR square mean value update section 304 calculates a square mean value $\eta(x, y)$ of pixel values by the IIR filter according to the above-described Expression (7).

Next, in step S103, the IIR variance value calculation process is executed.

This process is executed, for example, by the IIR variance value calculation section 305 illustrated in FIG. 6.

The IIR variance value calculation section 305 receives a mean value $\mu(\hat{\ })(x, y)$ of pixel values calculated by the IIR mean value update section 303 according to the above-described Expression (6) in step S101, and a square mean value $\eta(x, y)$ of the pixel values calculated by the IIR square mean value update section 304 according to the above-described Expression (7) in step S102, and calculates the variance value $\mu(\hat{\ })(x, y)$ of the pixel values according to the above-described Expression (8).

Next, in step S104, the edge-preserving smoothing process is executed.

This process is executed, for example, by the edge-preserving smoothing processing section 306 illustrated in FIG. 6.

The edge-preserving smoothing processing section 306 receives a pixel $p_{HNR}(x, y)$ serving as a processing target, the vertical-direction mean value $\mu(\hat{\ })(x, y)$ of the pixel values calculated by the IIR mean value update section 303 according to the above-described Expression (6) in step S101, and the IIR variance value $\sigma_p^2(\hat{\ })(x, y)$ of the pixel values calculated by the IIR variance value calculation section 305 according to the above-described Expression (8) in step S103 to perform the edge-preserving smoothing process and remove noise.

The edge-preserving smoothing process is executed as the above-described Expressions (9), that is, a Wiener filter application process.

The process of step S105 is an IIR filter coefficient calculation process.

This process is executed in the IIR filter coefficient calculation section 307 illustrated in FIG. 6.

The IIR filter coefficient calculation section 307 receives the IIR variance value $_p^2(\hat{\ })(x, y-1$ calculated by the IIR variance value calculation section 305 according to the above-described Expression (8) in step S103, and calculates an IIR filter coefficient $\gamma(x, y)$ based on edge strength. For example, $\gamma(x, y)$ is calculated according to the above-described Expression (10) using the variance value calculated in the pixel position of (x, y−1) as an index of the edge strength.

The IIR filter coefficient $\gamma(x, y)$ calculated by the IIR filter coefficient calculation section 307 according to Expression (10) is provided to the IIR mean value update section 303 and the IIR square mean value update section 304 illustrated in FIG. 6. A process in which a new coefficient is applied to the next pixel processing is performed.

That is, the IIR mean value update section 303 calculates the IIR mean value $\mu(\hat{\ })(x, y)$ by applying the newly calculated IIR filter coefficient $\gamma(x, y)$ according to the above-described Expression (6).

The IIR square mean value update section 304 calculates the IIR square mean value $\eta(x, y)$ by applying the newly calculated IIR filter coefficient $\gamma(x, y)$ according to the above-described Expression (7).

In step S106, it is determined whether or not processing of all pixels has ended. If there are pixels that are not yet processed, the process of step S101 and subsequent steps is iteratively executed.

In step S106, the process ends if the processing of all the pixels is determined to have ended.

5. Other Embodiments

Next, modified examples of the above-described embodiments will be described.

Although a configuration in which denoising of the vertical direction is performed after denoising of the horizontal direction is performed has been described in the above-described embodiment, the order of the two denoising processes may be reversed.

In addition, although the number of denoising processes of each of the horizontal and vertical directions is one in the above-described embodiment, the denoising process may be performed many times.

Although the edge-preserving smoothing processing section 306 illustrated in FIG. 6 performs the Wiener filter application process as described above with reference to Expressions (9), other filters having the same effect as the Wiener filter may be applied.

Although the edge-preserving smoothing processing section 306 illustrated in FIG. 6 executes the edge-preserving smoothing process by applying the variance value calculated by the IIR variance value calculation section 305 according to the above-described Expression (8), the edge-preserving smoothing process may be configured to be performed by a predetermined filtering process, for example, by inputting the variance value calculated by the following Expression (13) to the edge-preserving smoothing processing section 306, when the approximate value $\sigma_p^2(\hat{\ })(x, y)$ of the variance value used in Expressions (9) is a value of a signal overlapping noise.

$$\hat{\sigma}_p^2(x,y) = \eta(x,y) - (\hat{\mu}(x,y))^2 \quad (13)$$

A square mean value of signal values should be stored so as to calculate the variance of the signal values in a process based on the Wiener filter and other processes. To reduce cost according to the storage, the following Expression (14) may be used as a method of calculating the approximate value $\sigma_p^2(\hat{\ })(x, y)$ of the variance value.

$$\hat{\sigma}_p^2(x,y) = (p_{HNR}(x,y) - \hat{\mu}(x,y))^2 \quad (14)$$

Although a variance value of noise should be set to be appropriate according to the feature of overlapping noise, it is well-known that there is a strong correlation between an ideal pixel value and a variance value of noise when a signal is an image captured by an imaging element.

A simplest model expressing this correlation is based on a linear relationship between a pixel value and a variance value, for example, as described in "Signal dependent raw image denoising using sensor noise characterization via multiple acquisitions," A. Bosco, et al., IS & T/SPIE Electronic Imaging, 2010.

Here, because an ideal pixel value is unclear, the approximate value of the variance value $\sigma_n^2(x, y)$ of noise can be calculated using the following Expression (15) if $\mu(\hat{\ })(x, y)$ is used as the approximate value of the pixel value.

$$\hat{\sigma}_n^2(t) = a\hat{\mu}(t) + b \quad (15)$$

In the above-described Expression (15), a and b are coefficients indicating a model obtained by measurement in advance.

If an input image is an image immediately after an input from the A/D conversion section 205 and the vertical-direction edge-preserving smoothing process is performed before the horizontal-direction edge-preserving smoothing process, the noise model as described above can be used.

In addition, if a plurality of colors are included in an image, a calculation result calculated in the edge-preserving smoothing process of a certain color may be used for calculations of other colors. This is because there is a correlation in a signal between different colors.

For example, if a color space is YCbCr, a clear edge exists at the side of a Y signal and noise is small as compared to Cb and Cr signals.

Thus, it is possible to improve processing performance using the calculation result calculated in the Y signal for processing of Cb and Cr signals.

As a calculation result capable of being diverted, for example, there is the coefficient β(x, y) of the above-described Expressions (9).

When the edge-preserving smoothing process of the vertical direction is performed for mosaic images of colors illustrated in FIGS. 2 and 3 described above, this is different from when the CbCr image illustrated in FIG. 4(*b*) is processed and, for example, a plurality of colors are included.

In this case, it is preferable that the mean value retention line memory 405 or the square mean value retention line memory 407 illustrated in FIG. 7 be used one by one for each color.

In addition, the color mosaic images illustrated in FIGS. 2 and 3 are examples and the present disclosure can be applied to other color arrangements.

6. Summary of Configurations According to Embodiments of Present Disclosure

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:

an infinite impulse response (IIR) mean value calculation section for calculating a mean value of signal values of reference pixels around a correction target pixel according to an IIR filter application process;

an IIR variance value calculation section for calculating a variance value of the signal values of the reference pixels around the correction target pixel according to the IIR filter application process;

an edge-preserving smoothing processing section for receiving the mean and variance values of the reference pixels and executing an edge-preserving smoothing process to which the mean and variance values are applied; and an IIR filter coefficient calculation section for updating an IIR filter coefficient to be applied to the IIR mean value calculation section and the IIR variance value calculation section according to a signal value of a pixel constituting an image.

(2) The image processing apparatus according to (1), wherein the edge-preserving smoothing processing section executes the edge-preserving smoothing process based on a Wiener filter application process.

(3) The image processing apparatus according to (1) or (2), wherein the edge-preserving smoothing processing section calculates a signal value after correction of the correction target pixel by a process of blending the mean value generated by the IIR mean value calculation section and a signal value of the correction target pixel according to the variance value calculated by the IIR variance value calculation section.

(4) The image processing apparatus according to any one of (1) to (3), wherein the edge-preserving smoothing processing section is configured to calculate a signal value after correction of the correction target pixel by a process of blending the mean value generated by the IIR mean value calculation section and a signal value of the correction target pixel, and executes the blend process in which a blend rate is set to (v1−v2)/v2 when the variance value calculated by the IIR variance value calculation section is v1 and a parameter by which strength of edge-preserving smoothing is controlled is v2.

(5) The image processing apparatus according to any one of (1) to (3), wherein the edge-preserving smoothing processing section is configured to calculate a signal value after correction of the correction target pixel by a process of blending the mean value generated by the IIR mean value calculation section and a signal value of the correction target pixel, and executes the blend process in which a blend rate is set to v1/(v1+v2) when the variance value calculated by the IIR variance value calculation section is v1 and a parameter by which strength of edge-preserving smoothing is controlled is v2.

(6) The image processing apparatus according to any one of (1) to (5), wherein the IIR filter coefficient calculation section sequentially calculates a new IIR filter coefficient according to an input signal value.

(7) The image processing apparatus according to any one of (1) to (6), wherein the IIR filter coefficient calculation section sequentially calculates a new IIR filter coefficient according to the variance value calculated by the IIR variance value calculation section.

(8) The image processing apparatus according to any one of (1) to (6), wherein the IIR filter coefficient calculation section sequentially calculates a new IIR filter coefficient based on a difference between a signal value of the correction target pixel and the mean value calculated by the IIR mean value calculation section.

(9) The image processing apparatus according to any one of (1) to (6), wherein the IIR filter coefficient calculation section sequentially calculates a new IIR filter coefficient based on a difference between a signal value of the correction target pixel and a signal value of a previous input pixel.

(10) The image processing apparatus according to any one of (1) to (9), wherein:

a two-dimensional image signal is input as a processing target image, and the edge-preserving smoothing process is applied in at least one of horizontal and vertical directions.

(11) The image processing apparatus according to any one of (1) to (10), wherein:

a two-dimensional image signal is input as a processing target image, the edge-preserving smoothing process is applied in at least one of horizontal and vertical directions, and an isotropic edge-preserving smoothing process is executed in the other direction.

(12) The image processing apparatus according to any one of (1) to (11), wherein:

a luminance signal image and a color signal image are separately input as a processing target image, and a process in which strength of edge-preserving smoothing is changed for each image is executed.

Further, a method of a process to be executed in the above-described apparatus and the like or a program for causing the process to be executed is also included in the configuration of the present disclosure.

In addition, a series of processes described in the specification can be executed by hardware, software, or a combination thereof. If a process according to software is executed, it is possible to install and execute a program recording the process sequence in a memory within a computer built in dedicated hardware or install and execute a program in a general-purpose computer in which various processes are executable. For example, the program can be pre-recorded on the recording medium. The program can be installed from the recording medium to the computer. In addition, it is possible to receive the program via a network such as a local area network (LAN) or the Internet and install the program on the recording medium such as a built-in hard disk.

Various processes described in the specification may be executed not only in the described time series, but also in parallel or separately according to processing capability of a device that executes the process or according to necessity. In addition, in this specification, a system is a logical set configuration including a plurality of devices. It is not necessary that the devices be in the same housing.

According to embodiments of the present disclosure as described above, an apparatus and method for reducing noise of an image is implemented.

Specifically, for example, mean and variance values of signal values of reference pixels around a correction target pixel are calculated according to an IIR filter application process and an edge-preserving smoothing process based on a Wiener filter application process is executed by receiving the calculated mean and variance values. Further, an IIR filter coefficient calculation section updates an IIR filter coefficient to be applied to an IIR mean value calculation section and an IIR variance value calculation section according to a signal value of an image. A parameter for use in the Wiener filter application process is calculated by the IIR filter application process, and an NR process corresponding to an image signal is implemented by adaptively changing a filter coefficient for use in an IIR application process.

The present disclosure contains subject matter related to that disclosed in Japanese Priority Patent Application JP 2011-128824 filed in the Japan Patent Office on Jun. 9, 2011, the entire content of which is hereby incorporated by reference.

What is claimed is:

1. An image processing apparatus comprising:
an infinite impulse response (IIR) mean value calculation section for calculating a mean value of signal values of reference pixels around a correction target pixel according to an IIR filter application process;
an IIR variance value calculation section for calculating a variance value of the signal values of the reference pixels around the correction target pixel according to the IIR filter application process;
an edge-preserving smoothing processing section for receiving the mean and variance values of the reference pixels and executing an edge-preserving smoothing process to which the mean and variance values are applied; and
an IIR filter coefficient calculation section for updating an IIR filter coefficient to be applied to the IIR mean value calculation section and the IIR variance value calculation section according to a signal value of a pixel constituting an image.

2. The image processing apparatus according to claim 1, wherein the edge-preserving smoothing processing section executes the edge-preserving smoothing process based on a Wiener filter application process.

3. The image processing apparatus according to claim 1, wherein the edge-preserving smoothing processing section calculates a signal value after correction of the correction target pixel by a process of blending the mean value generated by the IIR mean value calculation section and a signal value of the correction target pixel according to the variance value calculated by the IIR variance value calculation section.

4. The image processing apparatus according to claim 1, wherein the edge-preserving smoothing processing section is configured to calculate a signal value after correction of the correction target pixel by a process of blending the mean value generated by the IIR mean value calculation section and a signal value of the correction target pixel, and executes the blend process in which a blend rate is set to $(v1-v2)/v2$ when the variance value calculated by the IIR variance value calculation section is v1 and a parameter by which strength of edge-preserving smoothing is controlled is v2.

5. The image processing apparatus according to claim 1, wherein the edge-preserving smoothing processing section is configured to calculate a signal value after correction of the correction target pixel by a process of blending the mean value generated by the IIR mean value calculation section and a signal value of the correction target pixel, and executes the blend process in which a blend rate is set to $v1/(v1+v2)$ when the variance value calculated by the IIR variance value calculation section is v1 and a parameter by which strength of edge-preserving smoothing is controlled is v2.

6. The image processing apparatus according to claim 1, wherein the IIR filter coefficient calculation section sequentially calculates a new IIR filter coefficient according to an input signal value.

7. The image processing apparatus according to claim 1, wherein the IIR filter coefficient calculation section sequentially calculates a new IIR filter coefficient according to the variance value calculated by the IIR variance value calculation section.

8. The image processing apparatus according to claim 1, wherein the IIR filter coefficient calculation section sequentially calculates a new IIR filter coefficient based on a difference between a signal value of the correction target pixel and the mean value calculated by the IIR mean value calculation section.

9. The image processing apparatus according to claim 1, wherein the IIR filter coefficient calculation section sequentially calculates a new IIR filter coefficient based on a difference between a signal value of the correction target pixel and a signal value of a previous input pixel.

10. The image processing apparatus according to claim 1, wherein:
a two-dimensional image signal is input as a processing target image, and
the edge-preserving smoothing process is applied in at least one of horizontal and vertical directions.

11. The image processing apparatus according to claim 1, wherein:
a two-dimensional image signal is input as a processing target image,
the edge-preserving smoothing process is applied in at least one of horizontal and vertical directions, and
an isotropic edge-preserving smoothing process is executed in the other direction.

12. The image processing apparatus according to claim 1, wherein:
a luminance signal image and a color signal image are separately input as a processing target image, and
a process in which strength of edge-preserving smoothing is changed for each image is executed.

13. An image processing method to be executed in an image processing apparatus, comprising:
calculating, by an IIR mean value calculation section, a mean value of signal values of reference pixels around a correction target pixel according to an IIR filter application process;
calculating, by an IIR variance value calculation section, a variance value of the signal values of the reference pixels around the correction target pixel according to the IIR filter application process;

receiving, by an edge-preserving smoothing processing section, the mean and variance values of the reference pixels and executing an edge-preserving smoothing process to which the mean and variance values are applied; and updating, by an IIR filter coefficient calculation section, an IIR filter coefficient to be applied in the IIR mean value calculation step and the IIR variance value calculation step according to a signal value of a pixel constituting an image.

14. At least one non-transitory computer-readable storage having encoded thereon executable instructions that, when executed by at least one computer, cause the at least one computer to carry out a method for causing an image processing apparatus to execute image processing, the method comprising:

calculating, by an IIR mean value calculation section, a mean value of signal values of reference pixels around a correction target pixel according to an IIR filter application process;

calculating, by an IIR variance value calculation section, a variance value of the signal values of the reference pixels around the correction target pixel according to the IIR filter application process;

receiving, by an edge-preserving smoothing processing section, the mean and variance values of the reference pixels and executing an edge-preserving smoothing process to which the mean and variance values are applied; and updating, by an IIR filter coefficient calculation section, an IIR filter coefficient to be applied in the IIR mean value calculation step and the IIR variance value calculation step according to a signal value of a pixel constituting an image.

* * * * *